US012666486B2

(12) United States Patent
Qiu et al.

(10) Patent No.: US 12,666,486 B2
(45) Date of Patent: Jun. 23, 2026

(54) SYSTEM AND METHOD FOR PERFORMING AND REPORTING MEASUREMENTS IN WIRELESS COMMUNICATION NETWORKS

(71) Applicant: ZTE CORPORATION, Shenzhen (CN)

(72) Inventors: Zhihong Qiu, Shenzhen (CN); He Huang, Shenzhen (CN); Jianmin Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 481 days.

(21) Appl. No.: 17/670,192

(22) Filed: Feb. 11, 2022

(65) Prior Publication Data

US 2022/0191961 A1 Jun. 16, 2022

Related U.S. Application Data

(63) Continuation of application No. PCT/CN2019/100498, filed on Aug. 14, 2019.

(51) Int. Cl.
H04W 76/19 (2018.01)
H04B 7/06 (2006.01)
(Continued)

(52) U.S. Cl.
CPC ........ H04W 76/19 (2018.02); H04B 7/06964 (2023.05); H04W 24/10 (2013.01);
(Continued)

(58) Field of Classification Search
CPC ..... H04W 76/19; H04W 76/18; H04W 76/27; H04W 24/10; H04W 24/02;
(Continued)

(56) References Cited

U.S. PATENT DOCUMENTS

2013/0225178 A1* 8/2013 Kojima ......... H04W 36/008375
455/437
2013/0258890 A1 10/2013 Li et al.
(Continued)

FOREIGN PATENT DOCUMENTS

CN 109474451 A 3/2019
KR 20190080391 A * 7/2019 ............ H04W 76/27
(Continued)

OTHER PUBLICATIONS

English translation of KR 20190080391. (Year: 2019).*
(Continued)

*Primary Examiner* — Ricardo H Castaneyra
(74) *Attorney, Agent, or Firm* — Foley & Lardner LLP

(57) ABSTRACT

A system and method for measuring network parameters of a wireless communication network and reporting the measured network parameters to a network node are disclosed herein. In one embodiment, the system and method are configured to determine, by a wireless communication node, at least one parameter related to wireless communication devices in a wireless communication network; compare, by the wireless communication node, the at least one parameter with at least one threshold value; and report, by the wireless communication node, according to an outcome of the comparing, the at least one parameter to a second network node associated with the wireless communication network.

9 Claims, 6 Drawing Sheets

(51) Int. Cl.

| | |
|---|---|
| *H04W 24/10* | (2009.01) |
| *H04W 76/20* | (2018.01) |
| *H04W 74/0833* | (2024.01) |
| *H04W 74/0836* | (2024.01) |
| *H04W 74/0838* | (2024.01) |

(52) U.S. Cl.
CPC ........ *H04W 76/20* (2018.02); *H04W 74/0833* (2013.01); *H04W 74/0836* (2024.01); *H04W 74/0838* (2024.01)

(58) Field of Classification Search
CPC . H04W 74/0833; H04W 16/28; H04W 92/20; H04W 84/18; H04W 36/0094; H04W 76/20; H04W 74/0836; H04W 74/0838; H04B 7/0695
USPC ......................................................... 370/318
See application file for complete search history.

(56) References Cited

U.S. PATENT DOCUMENTS

| | | | | |
|---|---|---|---|---|
| 2014/0315549 | A1* | 10/2014 | Zhang ................... | H04W 48/10 455/434 |
| 2014/0369336 | A1 | 12/2014 | Prakash et al. | |
| 2015/0181470 | A1* | 6/2015 | Chai ..................... | H04W 36/18 455/438 |
| 2016/0262030 | A1* | 9/2016 | Dhanapal .............. | H04W 48/16 |
| 2019/0075613 | A1* | 3/2019 | Teyeb ................... | H04W 76/11 |
| 2019/0141541 | A1 | 5/2019 | Futaki | |
| 2019/0223154 | A1* | 7/2019 | Jia .......................... | H04W 68/02 |
| 2020/0068646 | A1* | 2/2020 | Kwon ................. | H04W 68/005 |
| 2020/0107369 | A1* | 4/2020 | Jeon ..................... | H04W 74/006 |
| 2021/0029745 | A1* | 1/2021 | Zhang ................... | H04W 80/02 |

FOREIGN PATENT DOCUMENTS

| | | |
|---|---|---|
| WO | WO-2011/018104 A1 | 2/2011 |
| WO | WO-2014/077547 A1 | 5/2014 |
| WO | WO-2018/143713 A1 | 8/2018 |

OTHER PUBLICATIONS

CMCC, "New Measurements for NR MDT" 3GPP TSG-RAN WG2 Meeting #105, R2-1901957, Mar. 1, 2019, Athens, Greece (4 pages).

Huawei et al., "Discussion on use cases for MDT (new compared with LTE MDT)" 3GPP TSG-RAN WG2 Meeting #105, R2-1901854, Mar. 1, 2019, Athens, Greece (4 pages).

Partial Supplementary European Search Report on EP Appl. No. 19941349.3, dated Jul. 22, 2022 (18 pages).

International Search Report and Written Opinion for PCT Appl. No. PCT/CN2019/100498, mailed Apr. 30, 2020 (7 pages).

Office Action for TW Appl. No. 113149732, dated Aug. 25, 2025 (with English translation, 24 pages).

* cited by examiner

600

602

SYSTEM AND METHOD FOR PERFORMING AND REPORTING MEASUREMENTS IN WIRELESS COMMUNICATION NETWORKS

CROSS-REFERENCE TO RELATED APPLICATIONS

This application claims the benefit of priority under 35 U.S.C. § 120 as a continuation of PCT Patent Application No. PCT/CN2019/100498, filed on Aug. 14, 2019, the disclosure of which is incorporated herein by reference in its entirety.

TECHNICAL FIELD

The disclosure relates generally to wireless communications and, more particularly, to systems and methods for configuring self-organizing networks.

BACKGROUND

Self-organizing networking technologies entail automated configuration of network elements when deployed into a networking environment. Network elements such as user equipment and nodes can be configured in real time based on current network conditions.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a first wireless communication node includes determining, by a first wireless communication node, at least one parameter related to wireless communication devices in a wireless communication network. The method further includes comparing, by the first wireless communication node, the at least one parameter with at least one threshold value. The method also includes reporting, by the first wireless communication node, according to an outcome of the comparing, the at least one parameter to a second wireless communication node associated with the wireless communication network.

In another embodiment, a method performed by a wireless communication device includes transmitting, to a wireless communication node, a message indicating availability of at least one measurement report. The method further includes receiving, from the wireless communication node, a message requesting the at least one measurement report. The method also includes measuring at least one parameter according to the at least one measurement report. The method further includes generating the at least one measurement report according to the measured at least one parameter. The method additionally includes transmitting, to the wireless communication node, the at least one measurement report.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
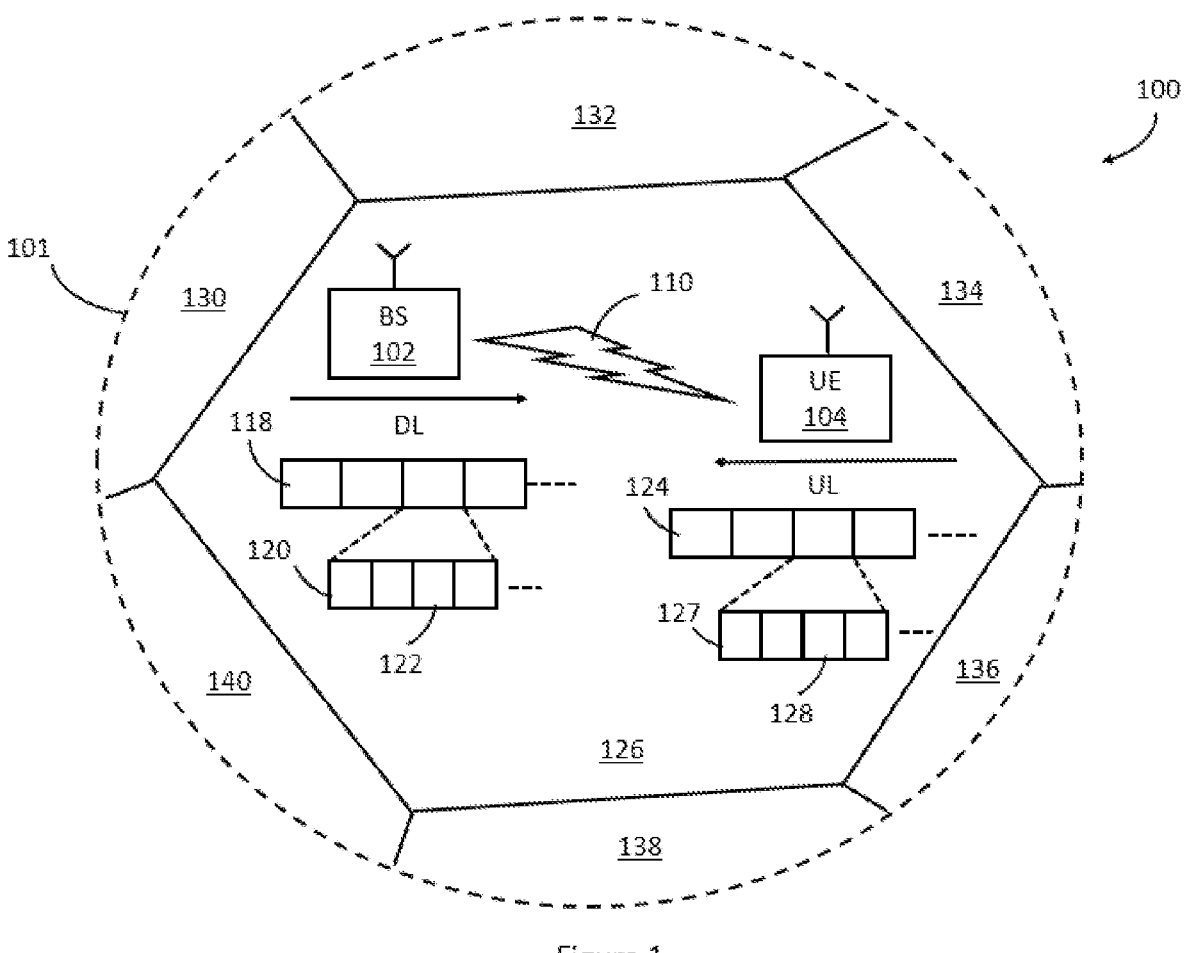
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
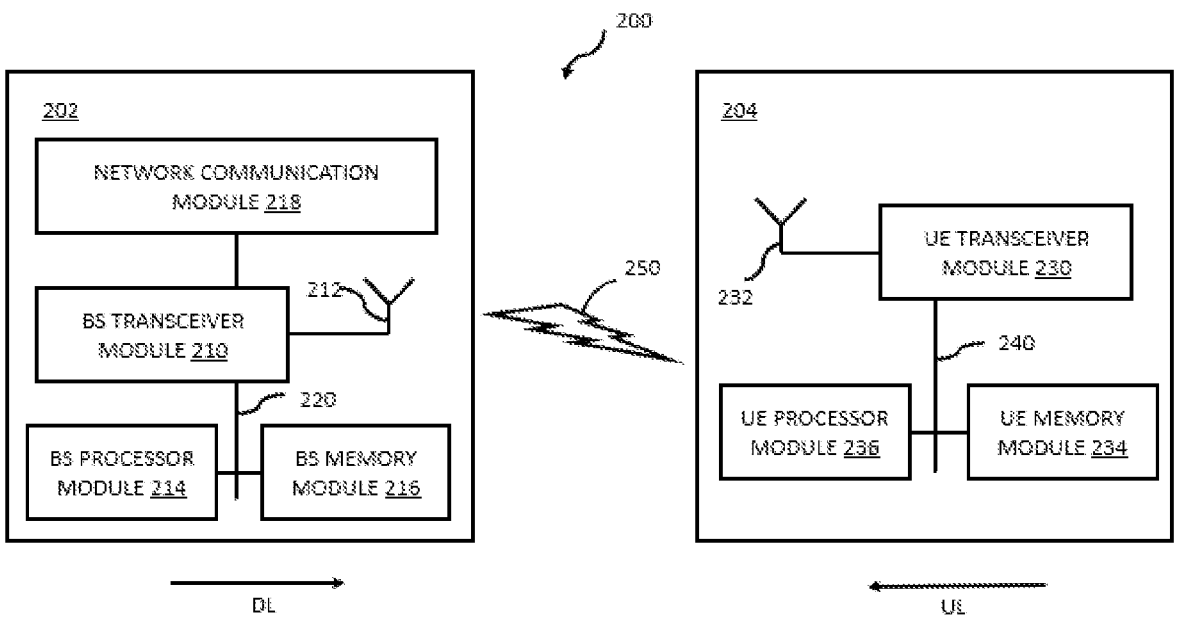
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., orthogonal frequency-division multiplexing (OFDM)/orthogonal frequency-division multiple access (OFDMA) signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Having discussed aspects of a networking environment as well as devices that can be used to implement the systems, methods and apparatuses described herein, additional details shall follow.

Self-organizing networks (SONs) can be viewed as falling into one of three categories: self-Configuration, self-optimization, and self-healing. Functionality of the SONs can include load balancing, coverage and capacity optimization, energy saving, random-access-channel (RACH) optimization, etc. These functions may be based on a large amount of measurements collected, for example, from information report of UE's side as well as performance related measurements collected and derived from the network's side. In some instances, SONs have been approached in LTE type networks. However, some measurement quantities in the LTE type networks may have to be modified so that the SONs can be adapted for implementation in a New Radio (NR) or 5G type networks. The adaptation may also include carrying out new measurements that can aid in operations, administration, and maintenance (OAM) to optimize the network configuration and to perform efficient mobility management. These measurements can be collected by the UE or by the network.

I. Measurements Performed by the Network

This portion of the discussion focuses on measurements performed by the network independent of whether the UE reports any of the measurements performed at the UE. As an example, a node, such as, for example, a base station, can measure one or more parameters related to the wireless communication network. The node can compare the values of the one or more measured parameters to threshold values. According to an outcome of the comparison, the node can report the measured parameter values to a second network node, e.g. Core network (CN), Trace collection Entity (TEC) and etc. The measured parameters can include, without limitation, Radio-access network (RAN) part of downlink delay, number of UEs in RRC connected state, number of UEs in RRC inactive state, average duration of UE staying in an inactive state, number of UE with duration time staying in RRC_INACTIVE state lower or lower or equal to some threshold, where the threshold can be configured by base station, or by core network or predefined in protocol, number of state transitions during each granularity period, on demand system information requests by UEs, dedicated preamble used for beam failure recovery, and number of preambles transmitted per cell. The node can compare one or more of the values of the measured parameters and send the values to the second network node of the wireless communication network. In some embodiments, the node can determine (e.g., select, calculate, identify, etc.) the values of the parameters during a granularity period per RAN based notification area. In some embodiments, the node can determine the values of the parameters during a granularity period per cell of the wireless communication network. The granularity period can refer to a time period for which the measurements for the one or more parameters are carried out. The granularity period can be pre-defined in the specification, or configured by the BS, or the OAM and provided to the UE, or configured by the core network (CN) and informed to the BS. In some example, the granularity period can be configured by the BS or the OAM and provided to the CN.

In some embodiments, the node can report a value of a measured parameter to a second network node, (e.g., a management server, CN, etc.) if the value is greater than a threshold value. In some embodiments, the node can report a value of a measured parameter to the second network node if the value is greater than or equal to a threshold value. In some embodiments, the node can report a value of a measured parameter to the second network node if the value is less than a threshold value. In some embodiments, the node can report a value of a measured parameter to the second network node if the value is less than or equal to a threshold value.

In some embodiments, the node can report the measured parameter to a second network node periodically. In some embodiments, the reporting period can be specified in the specification. In some examples, the reporting period can be configured from the second network node (e.g. CN) to the first network node (e.g. gNB/eNB). In some examples, the reporting period is configured by the first network node and provided to the second network node from the first network node.

Radio-Access Network (RAN) Part of Downlink Delay

Figure 3:
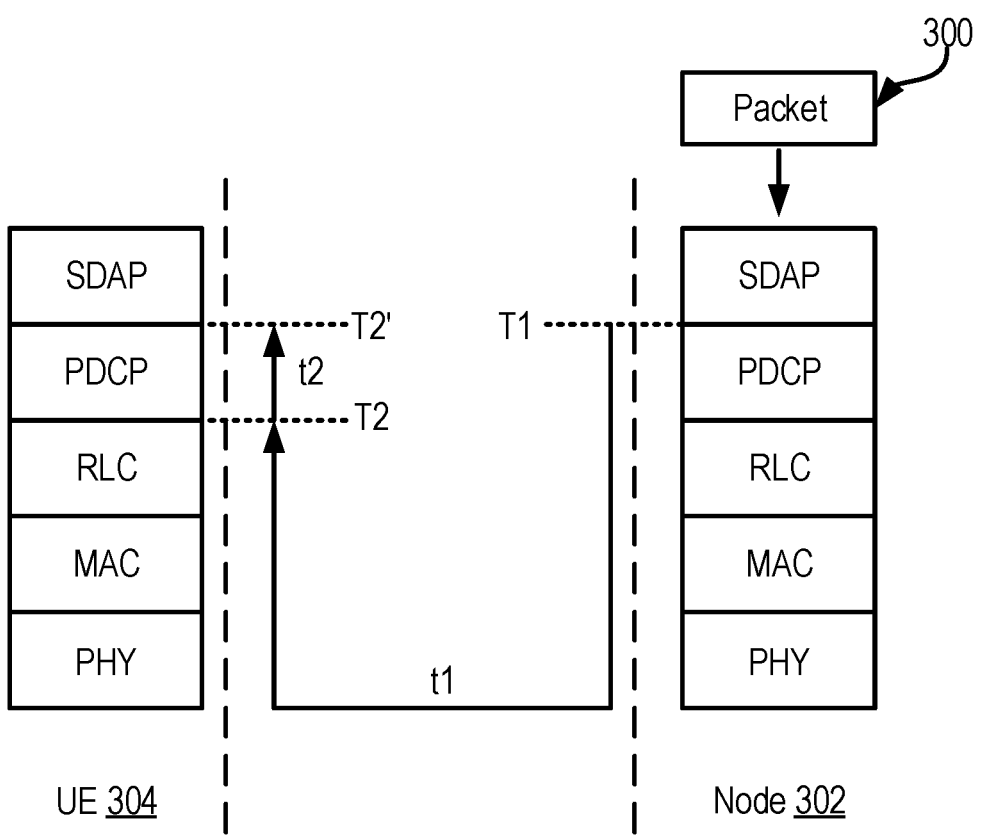
FIG. 3 shows a schematic of a downlink packet transmission from a node to a user equipment, in accordance with some embodiments of the present disclosure.

FIG. 3 shows a schematic of a downlink packet transmission from a node to a user equipment. In particular, FIG. 3 shows a schematic of a packet 300 that is transmitted during downlink (DL) from the node 302 to the user equipment 304. The packet 300 transmission is depicted with reference to the RAN protocol architecture, including the service data application protocol (SDAP), the packet data convergence protocol (PDCP), the radio-link control (RLC), the medium access control (MAC) and the physical layer (PHY). Total packet delay during DL within the wireless communication network can constitute the delay in the RAN and the delay in the core network (CN). The delay in the RAN is depicted as the delay t1 in FIG. 3, which is equal to a difference between time T2 and T1. This difference can include an average delay during DL air interference+RLC delay, average delay in DL in CU-UP(User plane of central unit) (optional for CU-DU split case), and average delay on F1 user pane interface (F1-U) (optional for CU-DU split case). The 5G radio access network architecture is supported to be split into the central unit (CU) and the distributed unit (DU) in order to support more flexible transport networks and provide enhanced user experience.

In one example, the reference point for arrival of a packet at the UE can be the PDCP upper service access point (SAP), while the reference point for successful reception of the packet at the UE can be the MAC lower SAP. However, on some other examples, as the RAN portion of the uplink (UL) delay is calculated as the difference between T2' and T1, the DL delay measurement can also include the PDCP re-ordering part at the UE's side. That is, the DL delay measurement can also include the time period t2. As a result, the RAN portion of the delay can be equal to T2'-T1. In some embodiments, this difference can be determined (e.g., selected, calculated, identified, etc.) based on sum of the time when the last part of an RLC service data unit (SDU) packet was received and all previous RLC SDU packets have been successfully received according to a status report, minus time when the last part of the same packet was transmitted over the air divided by a total number of RLC SDUs arriving at the MAC lower SAP. In instances where the RLC SDU is to be retransmitted, (e.g., for Acknowledge Mode), the delay would still include only one contribution to the measurement. In some embodiments, separate counters can be maintained for each mapped 5G QoS indicator (5QI) (or QoS class identifier (QCI)). In some examples, the base station or the node can measure the RAN part of the DL delay per data radio bearer (DRB). In some embodiments, the PDCP reordering delay at UE's side can be reported from UE to a base station, or a node.

Number of UEs in the RRC_CONNECTED State

In some examples, the node can measure the number of UEs in the RRC_CONNECTED state as the parameter. Within the wireless communication network, a wireless communication device (e.g., a UE) can be in different states depending on the traffic activity. The states can include, for example, RRC_INACTIVE, RRC_IDLE, and RRC_CONNECTED. In the RRC_CONNECTED state, the RRC context is established and all parameters needed for communication between the device and the RAN are known to both the device and the node. The node can measure a number of UEs that are in the RRC_CONNECTED state during a granularity period. In some examples, the node can determine (e.g., select, calculate, identify, etc.) the maximum number of UEs in the RRC_CONNECTED state. In some examples, the node can determine a mean number of UEs in the RRC_CONNECTED state during the granularity periods. The node can compare the maximum or the mean number of UEs in the RRC_CONNECTED state with threshold values.

In some examples, the node can report information to the second network node upon determining that the maximum number of UEs in the RRC_CONNECTED state is greater than or greater than or equal to the threshold value. In some examples, the node can report information to the second network node upon determining that the maximum number of UEs in the RRC_CONNECTED state is less than or less than or equal to the threshold value. In some examples, the node can report information to the second network node upon determining that the mean number of UEs in the RRC_CONNECTED state is greater than or greater than or equal to the threshold value. In some examples, the node can report information to the second network node upon determining that the mean number of UEs in the RRC_CONNECTED state is less than or less than or equal to the threshold value.

In some examples, the threshold values with which the maximum number of UEs in the RRC_CONNECTED state or the threshold values with which the mean number of UEs in the RRC_CONNECTED state are compared to can be determined in several ways. For example, the threshold values can be specified in the specification, e.g., NR, the threshold values can be configured from the second network node (e.g. CN) to the first network node (e.g. gNB/eNB), or the threshold values can be configured by the first network node (e.g. gNB/eNB), and provided to the second network node from the first network node.

Based on the outcome of the comparison of the measured value and the corresponding threshold, the node can report information to the second network node. The information can include the maximum and or mean number of UEs in the RRC_CONNECTED state, the time information associated with when the measurements were collected, and corresponding identifiers for the measurement granularity (e.g., physical cell ID for per cell measurement).

In some examples, the node can determine the mean number of UEs in the RRC_CONNECTED state during each granularity period per cell of the wireless communication network. The node can sample the states of the UEs during a pre-defined interval, and determine the number of UEs in the RRC_CONNECTED state for each cell, and then determine the arithmetic mean of the numbers across all cells. In a similar manner, the node can determine the maximum number of UEs in the RRC_CONNECTED state by determining maximum number across all cells. In some examples the pre-defined interval can refer to a sampling period within the granularity period. As for example, the sampling interval can refer to a time period after which the value of a parameter is measured. The sampling can repeated several times spaced apart in time by the sampling period. The sampling period can be less than the granularity period.

In some examples, the node can determine (e.g., select, calculate, identify, etc.) the maximum and mean values in contexts other than the per cell measurements discussed above. For example, the node can determine the mean and the maximum values based on a network slice, where a network slice is a logical network serving a certain business or customer need. In some such examples, the node can determine the maximum and the mean values based on values determined across a number of network slices. In some other examples, the node can determine the maximum and the mean values across multiple public land mobile networks (PLMNs). In some other examples, the node can measure the maximum and mean values based on non-public network (NPN) IDs. For example, the node can determine the number of UEs in the RRC_CONNECTED state per NPN, which can be identified by one or more of an NPN ID, a CAG ID (where CAG denotes a closed access group) or a PLMN ID. In some embodiments, the node can determine the mean and the maximum values over various combination of contexts. For example, the node can determine the mean and maximum values based on values determined in each slice of each PLMN, or in each cell in each PLMN, or for each slice in each cell, or for each NPN ID in each PLMN.

In some embodiments, the pre-defined interval after which the node samples the state of the UEs and the granularity period can be specified in the specification. In some examples, the predefined interval and the granularity period can be configured from the CN to the gNB/eNB. In some examples, the pre-defined interval and the granularity period is provided to the CN from the gNB/eNB (e.g., the pre-defined interval and the granularity period can be determined by the gNB/eNB or the second network node).

Number of UEs in the RRC_INACTIVE State

In this example, the node can measure the mean and the maximum number of UEs in the RRC_INACTIVE state. In the communication network, when an RRC connection is suspended, (e.g., by receiving an RRC release message with suspension from the network), the UE can store the UE inactive access stratum (AS) context and any configuration information received from the network, and can transition into the RRC_INACTIVE state. In the RRC_INACTIVE state, the RAN can configure an RAN-based notification area to the UE, and the UE can perform RAN-based notification area updates periodically and when moving outside the configured RAN-based notification area. In some examples, the last serving eNB can maintain the UE context and the UE associated NG connection with the serving access and mobility management function (AMF) and the user plane function (UPF). In some examples, the UE context maybe re-allocated or released.

The node can measure the number of UEs in the RRC_I-NACTIVE state during each granularity period. Similar to that discussed above in relation to determining the number of UEs in the RRC_CONNECTED state, the node can determine the value of a maximum number or a mean number of UEs in the RRC_INACTIVE state. In some examples, the node can report information to the second network node upon determining that the maximum number of UEs in the RRC_INACTIVE state is greater than or greater than or equal to a threshold value. In some examples, the node can report information to the second network node upon determining that the maximum number of UEs in the RRC_INACTIVE state is less than or less than or equal to the threshold value. In some examples, the node can report information to the second network node upon determining that the mean number of UEs in the RRC_INACTIVE state is greater than or greater than or equal to the threshold value. In some examples, the node can report information to the second network node upon determining that the mean number of UEs in the RRC_INACTIVE state is less than or less than or equal to the threshold value.

In some examples, the threshold values with which the maximum number of UEs in the RRC_INACTIVE state or the threshold values with which the mean number of UEs in the RRC_INACTIVE state are compared to can be determined in several ways. For example, the threshold values can be specified in the specification, e.g. NR, the threshold values can be configured from a second network node (e.g. CN, TEC and etc.) to a first network node (e.g., gNB/eNB), or the threshold values can be provided to the second network node from the first network node (e.g., the predetermined interval is determined by gNB/eNB or the second network node).

Based on the outcome of the comparison of the measured value and the corresponding threshold, the node can report information to the second network node. The information can include the maximum and or mean number of UEs in the RRC_INACTIVE state, the time information associated with when the measurements were collected, and corresponding identifiers for the measurement granularity (e.g., physical cell ID for per cell measurement).

In some examples, the node can perform the measurements in several ways. For example, in one approach, the node can perform the measurements per RAN-based notification area, while in another approach, the node can perform the measurements per cell. With regard to the measurements performed per RAN-based notification area, the node can determine the mean number of UEs in the RRC_INACTIVE state during each granularity period per RAN-based notification area. The node can sample the state of the UEs in each RAN-based notification area at predefined intervals, and determine the mean across the RAN-based notification areas. The node can also determine the maximum number of UEs in the RRC_INACTIVE state during each granularity period per RAN-based notification area. The node can determine the number of UEs in the RRC_INACTIVE state during each granularity period per RAN-based notification area, and then use the maximum value from across all RAN-based notification areas.

With regard to the measurements performed per cell, after the RRC connection suspension, the UE may no longer be connected to the cell. However, the last serving cell would still store the UE context. Thus, an alternative approach to performing per cell measurements can be to consider the UE in the RRC_INACTIVE state belongs to the last serving cell. Or in another alternative, he INACTIVE UE is considered "belonging to" the cell in which the UE was released from RRC_CONNECTED state to RRC_INACTIVE state. Or in another example, the UE in RRC_INACTIVE state is considered "belonging to" the cell in which it's context is stored. A mean number of UEs in the RRC_INACTIVE state provides the mean number of UEs in the RRC_INACTIVE state during each granularity period per cell. The node can sample at a pre-defined interval, the number of users in the RRC_INACTIVE state for each cell, where a UE in the RRC_INACTIVE state is considered to belong to the last serving cell. The node can then determine the mean of the number of UEs in the RRC_INACTIVE state across all the cells.

The maximum number of UEs in the RRC_INACTIVE state provides the maximum number of UEs in the RRC_I-NACTIVE state during each granularity period per cell. Similar to determining the mean, the node can determine the maximum value by selecting the highest number of UEs in the RRC_INACTIVE state across the cells. In some examples, the node may also determine a percentage of RRC_INACTIVE UEs within the cells during each granularity period. The node can determine the percentage based on a ratio of the mean number of UEs in the RRC_INAC-TIVE state and a sum of the mean number of UEs in the RRC_INACTIVE state and the mean number of UEs in the RRC_CONNECTED state.

In some examples, the node can determine the maximum and mean values in granularities other than the per cell measurements discussed above. For example, the node can determine the mean and the maximum values based on a network slice, where a network slice is a logical network serving a certain business or customer need. In some such examples, the node can determine the maximum and the mean values based on values determined across a number of network slices. In some other examples, the node can determine the maximum and the mean values across multiple public land mobile networks (PLMNs). In some other examples, the node can measure the maximum and mean values based on non-public network (NPN) IDs. For example, the node can determine the number of UEs in the RRC_INACTIVE state per NPN, which can be identified by one or more of an NPN ID, a CAG ID (where CAG denotes a closed access group) or a PLMN ID. In some embodiments, the node can determine the mean and the maximum values over various combination of contexts. For example, the node can determine the mean and maximum values based on values determined in each slice of each PLMN, or in each cell in each PLMN, or for each slice in each cell, or for each NPN ID in each PLMN, for each cell in each RAN notification area, or for each RAN notification area in each PLMN.

In some embodiments, the pre-defined interval during which the node samples the state of the UEs and the measuring period can be specified in the network (e.g., NR) specification. In some examples, the pre-defined interval and the granularity period can be configured from the second network node (e.g. CN) to the first network node (e.g. gNB/eNB). In some examples, the pre-defined interval and the granularity period is configured by the first network node and provided to the second network node from the first network node (e.g., the pre-defined interval and the granularity period can be determined by the gNB/eNB or the second network node).

Average Duration of UE in the Inactive State

Figure 4:
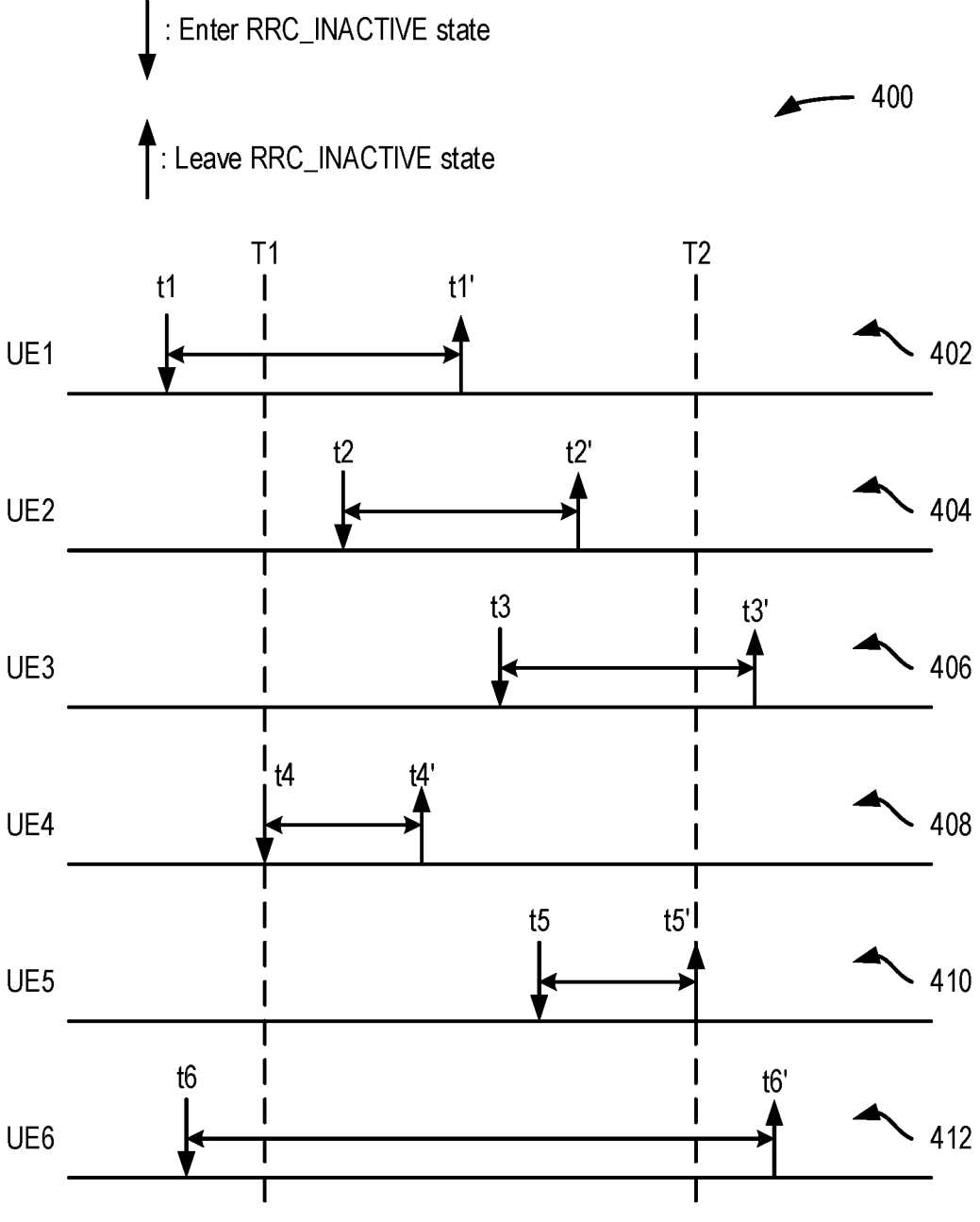
FIG. 4 shows an example timing diagram depicting the durations for which various user equipment stay in the inactive state, in accordance with some embodiments of the present disclosure.

In some examples, the parameter the node measures can include the average or mean duration for which the UEs stay in the inactive state. This measurement can provide the average duration for which the UE stays in the RRC_INACTIVE state during each granularity period per cell or per RAN-based notification area. FIG. 4 shows an example timing diagram 400 depicting the durations for which various UEs stay in the inactive state. In particular, the timing diagram 400 includes a first duration 402 associated with the first UE (UE1), a second duration 404 associated with the second UE (UE2), a third duration 406 associated with the third UE (UE3), a fourth duration 408 associated with the fourth UE (UE4), a fifth duration 410 associated with the fifth UE (UE5), and a sixth duration 412 associated with the sixth UE (UE6). UE1 enters the RRC_INACTIVE state at time t1 and leaves the RRC_INACTIVE state at time t1'. UE2 enters the RRC_INACTIVE state at time t2 and leaves the RRC_INACTIVE state at time t2'. UE3 enters the RRC_INACTIVE state at time t3 and leaves the RRC_INACTIVE state at time t3'. UE4 enters the RRC_INACTIVE state at time t4 and leaves the RRC_INACTIVE state at time t4'. UE5 enters the RRC_INACTIVE state at time t5 and leaves the RRC_INACTIVE state at time t5'. UE6 enters the RRC_INACTIVE state at time t6 and leaves the RRC_INACTIVE state at time t6'. Time period T1 to T2 can denote the time period of observation. It should be understood the timings depicted in FIG. 4 are only examples, and that the timings may vary based on the implementations.

Based on the timings of the UEs entering and leaving their respective RRC_INACTIVE states, the node and determine an average amount of time the UEs stay in the RRC_INACTIVE state. In one approach, the node can determine the mean by determining the sum of durations of staying in the RRC_INACTIVE state for those UEs which leave the RRC_INACTIVE state during the observation period divided by the total number of UEs which leave the RRC_INACTIVE state during the observation period. From FIG. 4 it can be seen that UE1, UE2, UE4, and UE5 are the UEs that leave their respective RRC_INACTIVE state during the observation time (T1 to T2). Therefore, the mean time can be equal to $((t1'-t1)+(t2'-t2)+(t4'-t4)+(t5'-t5))/4$.

In another approach, the node can determine the average amount of time the UEs stay in the RRC_INACTIVE state by determining the sum of durations of staying in the RRC_INACTIVE state for those UEs which both enter and leave the RRC_INACTIVE state during the observation period divided by the total number of UEs that both enter and leave their respective RRC_INACTIVE states during the observation period. As seen in FIG. 4, UE2, UE4, and UE5 are the only UEs that both enter and leave their respective RRC_INACTIVE state during the observation period (T1 to T2). Therefore, the mean time can be equal to $((t2'-t2)+(t4'-t4)+(t5'-t5))/3$ In yet another approach, the node can determine the average amount of time the UEs stay in the RRC_INACTIVE state by determining the sum of durations of staying in the RRC_INACTIVE state during the observation period within the RAN-based notification area divided by the total number of UEs counted within the observation period within the RAN-based notification area. In some embodiments, the node can measure the duration of staying in the RRC_INACTIVE period based on the time T1 (the time of start of the observation period) and the time T2 (the time of end of the observation period). Referring again to FIG. 4, the mean time can be equal to $((t1'-T1)+(t2'-t2)+(T2-t3)+(t4'-t4)+(t5'-t5)+(T2-T1))/6$.

In some examples, the parameter the node measures can include the duration time for which the UE stay in the inactive state per RAN based notification area. In some embodiments, the INACTIVE UE might re-select to another cell (e.g., target cell) from a source cell. In this case, if UE remains in RRC_INACTIVE state, the duration time of UE staying in RRC_INACTIVE will continue to be counted. In some examples, the source cell will provide the time span, which is the duration time of UE staying in RRC_INACTIVE state, to the target cell. The target cell can continue to count the duration time on top of the time span received if UE remains in RRC_INACTIVE state. In another examples, the duration time can be considered as continue in case the RRC resume procedure is initiated only for the purpose of ran notification area update. In some examples, the source cell will provide the cell ID of the cell where UE was released from RRC_CONNECTED state to RRC_INACTIVE state to the target cell. In this case, the network node is aware of the cell ID of the cell where INACTIVE UE was released from RRC_CONNECTED state to RRC_INACTIVE state.

In some examples, the node also can determine a number of UEs that stay in the RRC_INACTIVE state per RAN-based notification area for a duration that is less than or equal to a threshold value within a granularity period. In some examples, the node can also determine a percentage of the UEs that stay in the RRC_INACTIVE state per RAN-based notification area for a duration that is less than or equal to a threshold value within the granularity period. The node can determine the percentage, for example, as a sum of the number of UEs that stay in the RRC_INACTIVE state for a duration that is less than or equal to a threshold value divided by the total number of UEs in the RRC_INACTIVE state per RAN-based notification area per granularity period.

In some embodiments, the threshold value and the granularity period can be specified in the network (e.g., NR) specification. In some examples, the threshold value and the granularity period can be configured from the CN to the gNB/eNB. In some examples, the threshold value and the granularity period is provided to the CN from the gNB/eNB (e.g., the threshold value and the granularity period can be determined by the gNB/eNB or the second network node).

In some embodiments, the node can measure the durations discussed above per cell of the wireless communication network. The cell to which the UE belongs to can be determined by the cell ID associated with the UE. Or in another alternative, the UE is considered to belong to the cell where UE was released from RRC_CONNECTED state to RRC_INACTIVE state. In addition, the UE in the RRC_I-NACTIVE state can be considered to belong to the last serving cell. Or in another example, the UE in RRC_INAC-TIVE state is considered "belonging to" the cell in which it's AS context is stored. The node can measure the durations discussed above also based on a network slice, where the network slice is a logical network serving a certain business or customer need. The node can collect and/or report the number of UEs in the RRC_INACTIVE state per network slice (e.g., for each network slice, or for one or multiple specific network slices). The node can measure the durations discussed above also based on the PLMN. For example, the node can collect and/or report the number of UEs in the RRC_INACTIVE state per PLMN. The node can measure the durations discussed above also based on the NPN ID. For example, the node can collect and/or report the number of UEs in the RRC_INACTIVE state per non-public network, which can be identified by the NPN ID or a CAG ID or a PLMN ID and the NPN ID or the PLMN ID and the CAG ID, or any other combinations of the NPN ID, CAG ID, and the PLMN ID. The node can measure the durations for various combinations, such as, for example, for each network slice in each PLMN, for each cell in each PLMN, for each network slice in each cell, for each NPN ID in each PLMN, for each cell in each RAN-based notification area, or for each RAN-based notification area in each PLMN. In some embodiments, the UE context can include a time stamp indicating when the UE enters the RRC_INACTIVE state. The node can then utilize the time stamp to determine the duration for which the UE remains in the RRC_INACTIVE state.

The node can report the measurements discussed above to the second network node when one or more conditions are satisfied. For example, the node can report the measurements to the second network node based on the determination that the mean duration of the UE staying in the RRC_INACTIVE state is less than or equal to a pre-defined threshold value. In some examples, the node can report the measurements to the second network node based on the determination that the number of UEs with duration of staying in the RRC_INACTIVE state that is less than or equal to a threshold time period is less than or equal to a threshold number. In some examples, the node can report the measurements to the second network node based on the determination that a percentage of UEs with duration of staying in the RRC_INACTIVE state that is less than or equal to a threshold time period is less than or equal to a threshold percentage value.

The node can report the measured durations and additional information to the second network node. For example, the report can include the mean duration for which the UEs stay in the RRC_INACTIVE state, the number of UEs with durations of staying in the RRC_INACTIVE state that is less than or equal to a threshold duration value, the percentage of UEs with duration times that are less than or equal to a threshold duration value, the time information when the measurements are collected by the node, and the corresponding identifier for measurement granularity (e.g., physical cell ID for per cell measurements).

The threshold values, such as the threshold duration values, etc., can be specified in the network specification, or can be configured from the CN to the gNB/eNB, or can be provided to the CN from the gNB/eNB.

Number of State Transactions During Each Granularity Period

Figure 5:
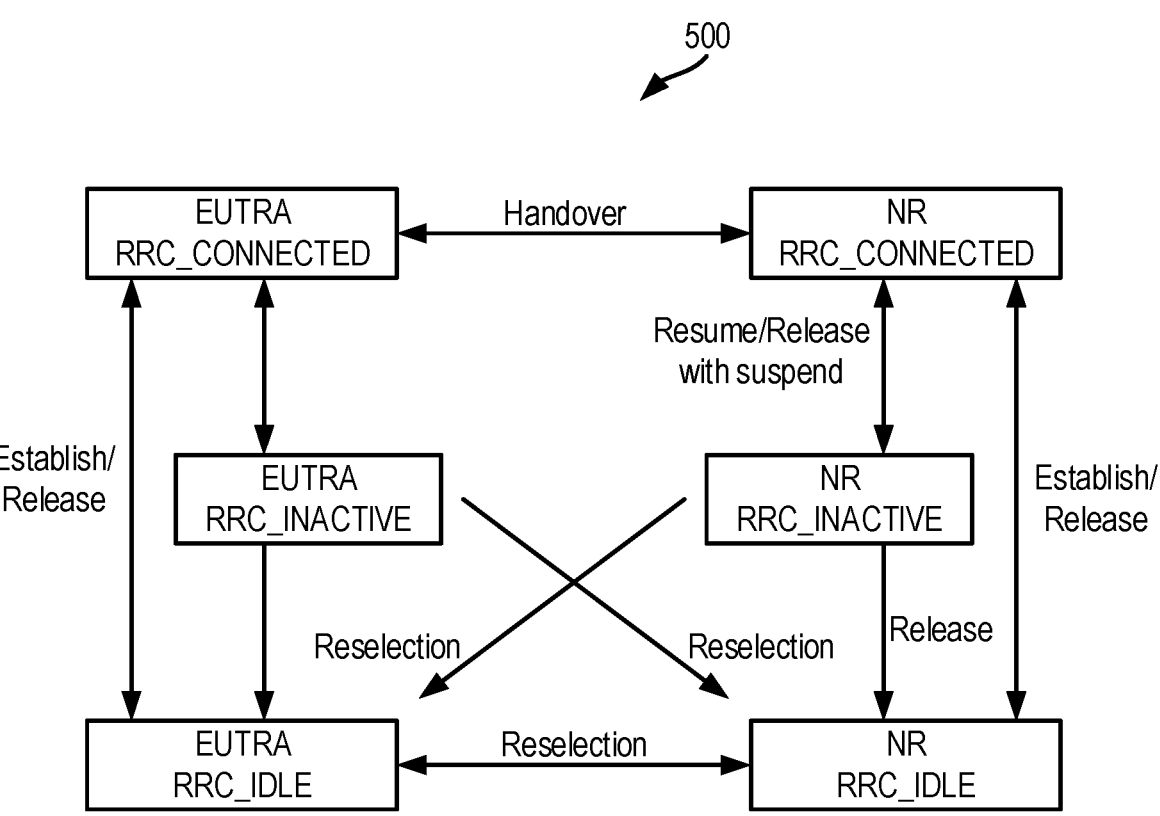
FIG. 5 shows an example state diagram representing state machine and state transitions of user equipment in a wireless communication network, in accordance with some embodiments of the present disclosure.

FIG. 5 shows an example state diagram 500 representing state machine and state transitions in NR and EUTRA. The node can measure parameters such as state transitions by a UE and report these state transitions to a second network node. In particular, in one example, the node can measure a total number of transitions from RRC_INACTIVE/RR-C_IDLE state to RRC_CONNECTED state during each granularity period per cell. The node can determine the total number based on a sum of the number of RRCSetupCom-plete and RRCResumeComplete messages received from each cell during each granularity period. The RRCSet-upComplete message indicates a successful completion of an RRC connection establishment, while the RRCResume-Complete message indicates a successful completion of an RRC connection resumption. The node can also determine the total number based on the difference in the number of UEs in RRC_CONNECTED state per cell in two consecu-tive granularity periods.

In another example, the node can measure the total number of transitions from the RRC_CONNECTED state to the RRC_INACTIVE state during each granularity period per cell. In one example, the node can determine this total number per RAN-based notification area. That is, the node can determine a difference between the numbers of UEs in the RRC_INACTIVE state per RAN-based notification area in two consecutive granularity periods. In another example, the node can determine this total number per cell. That is, the node can determine the difference between the numbers of UEs in the RRC_INACTIVE state per cell in two consecu-tive granularity periods.

In yet another example, the node can measure the total number of transitions from the RRC_INACTIVE state to the RRC_IDLE state. A UE transitions from the RRC_INAC-TIVE state to the RRC_IDLE state by receiving an RRCRe-lease message without suspension or receiving the RRCRe-ject message from the network. In one example, the node can determine this total number of transitions per RAN-based notification area. That is, the node can determine a sum of the number of RRCRelease messages without suspension configuration and RRCReject messages scrambled with Temporary Cell Radio Network Temporary Identifier (TC-RNTI) transmitted per RAN-based notification area during each granularity period. In another example, the node can determine this total number of transitions per cell. That is, the node can determine a sum of the number of RRCRelease without suspension configuration and RRCReject scrambled with TC-RNTI transmitted per cell during each granularity period.

In some embodiments, the node can report the total number of transitions discussed above to the second network node. In some embodiments, the node can report the total number of transitions discussed above to the second network node based on outcomes of comparisons of the total num-bers with corresponding threshold values. For example, the node can report the total number of transition values based on a determination that the total number is greater than (or greater than or equal to) or less than (or less than or equal to) a threshold value.

On Demand System Information

In one embodiment, the node can measure and report system information to the second network node. System Information (SI) is divided into the Master Information Block (MIB) and a number of System Information Blocks (SIBs). The MIB is always transmitted on the Broadcast Channle (BCH) periodically, which contains necessary information for decoding SIB1. SIB1 is transmitted on the downlink shared channel (DL-SCH) periodically, which carries essential information for (re)-selection of cell, access control, RACH resource configuration and etc. SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. A UE can request system information other than MIB and SIB1 according to on demand SI acquisition procedure, which includes MSG1 based SI request procedure if dedicated resource is configured or MSG3 based SI request procedure if dedicate resource is not configured. After receiving the preamble for the SI request, the node or the network can broadcast the requested system information. As the mapping of the preamble and the requested SI message is configured by the network, the node is able to count the SI messages being requested during each granularity periods.

In one example, the node can determine the number of SI request received for each SI messages per cell. In one approach, the node can determine the number of SI request received messages during each granularity period per sell for each SI (each SI message can include one or more SIBs). In another approach, the node can determine the number of SI request received during each granularity period per cell for each SIB. In yet another approach, the node can determine the percentage of transmission time for one SIB, which can be defined as the actual transmission occasion/potential transmission occasion within the granularity period per cell.

In another example, the node can determine the number of SI request received for each SI messages per system information area if the SIB is set to be area specific. System information area is the area where the area specific SIB is applicable. In some implementations, the system information area can consist of one or more cells, and be identified by the systeminformationAreaID. The systeminformation-AreaID can be unique within a single PLMN. In one approach, the node can determine the number of SI request received for each SI messages during each granularity period per system information area. In another approach, the node can determine the number of SI request received for each SIB during each granularity period per cell per system information area. In yet another approach, the node can determine a percentage of transmission time for one SIB, which is defined as the actual transmission occasion/potential transmission occasion within the granularity period.

The node can report the measurement information to the management node based on the outcome of a comparison between the numbers of SI or SIBs discussed above with corresponding threshold values. In one example, the node can report measurement information to the second network node if the number of SI-x messages requested during each granularity period is less than, or is less than or equal to, or is greater than, or is greater than or equal to a corresponding threshold value threshold-x, in this example the x is the index of the SI. In another example, the node can report measurement information to the second network node if the number of SIB-x messages requested during each granularity period is less than, or is less than or equal to, or is greater than, or is greater than or equal to a corresponding threshold value, in this example the x is the index of the SIB. In another example, the node can report measurement information to the second network node if a percentage of transmission time for one SIB is less than, or is less than or equal to, or is greater than, or is greater than or equal to a corresponding threshold value. The threshold values can be specified in the specification of the NR, or the threshold values can be configured from the core network (CN) to gNB/eNB, or the threshold values can be provided to the CN from the gNB/eNB (e.g., the predetermined interval is determined by gNB/eNB or the second network node).

The report provided to the second network node can include the number of SI-x messages requested during each granularity period, the number of SIB-x messages requested during each granularity period, the percentage of transmission time for one SIB message, the timing information of when the measurements were collected, and the cell ID or system information area ID where the measurements were collected, in this example the x is the index of the SI or SIB.
Dedicated Preamble Used for Beam Failure Recovery (BFR) Per Beam/Per Cell The node can also determine the number of dedicated preambles reserved for BFR received during each granularity period per beam. In addition, the node can count the number of dedicated preambles reserved for BFR received during each granularity period per cell or per beam. The node can compare the numbers determined above with corresponding threshold values, and based on the outcome of the comparison, can provide the second network node with the values of the numbers, and/or the beam index, and/or the cell ID, and/or the time information when the measurement is performed.
Number of Preambles Transmitted for Different RACH Type Per Cell The node can also measure the number of preambles used for various purposes transmitted during each granularity period. For example, the node can measure the number of preambles used for a two-step RACH during each granularity period per cell. In another example, the node can measure the number of preambles used for a four-step RACH during each granularity period per cell. In another example, the node can determine a ratio of the number of preambles used for a two-step RACH and the number of preambles used for a four-step RACH during each granularity period per cell. In yet another approach, the node can determine a percentage of the number of preambles used for the two-step RACH of the total number of preambles received during each granularity period per cell. In yet another approach, the node can determine a percentage of the number of preambles used for the four-step RACH of the total number of preambles received during each granularity period per cell.

The node can also measure the number of preambles transmitted in different type of uplink carrier during each granularity period. For example, the node can measure the number of preambles transmitted on normal uplink carrier (NUL) during each granularity period per cell. In another example, the node can measure the number of preambles transmitted on supplementary uplink carrier (SUL) during each granularity period per cell. In another example, the node can determine a ratio of the number of preambles transmitted on different type of uplink carrier during each granularity period per cell. In yet another approach, the node can determine a percentage of the number of preambles transmitted on SUL of the total number of preambles received during each granularity period per cell. In yet another approach, the node can determine a percentage of the number of preambles transmitted on NUL of the total number of preambles received during each granularity period per cell.

In another example, the number of preamble used for 2 step RACH and 4 step RACH can be measured separately in supplementary uplink carrier (SUL) and normal uplink carrier (NUL) during each granularity period per cell. For example, the node can measure the number of preambles used for a two-step RACH in NUL during each granularity period per cell. In another example, the node can measure the number of preambles used for a two-step RACH in SUL during each granularity period per cell. In another example, the node can measure the number of preambles used for a four-step RACH in NUL during each granularity period per cell. In another example, the node can measure the number of preambles used for a four-step RACH in SUL during each granularity period per cell.

The node can compare the numbers determined above with corresponding threshold values, and based on the outcome of the comparison, can provide the second network node with at least one of the following parameter: the values of the numbers, the RACH type, the uplink carrier type, the cell ID, the time information when the measurement is performed.

II. Measurements Performed by the UE

Figure 6:
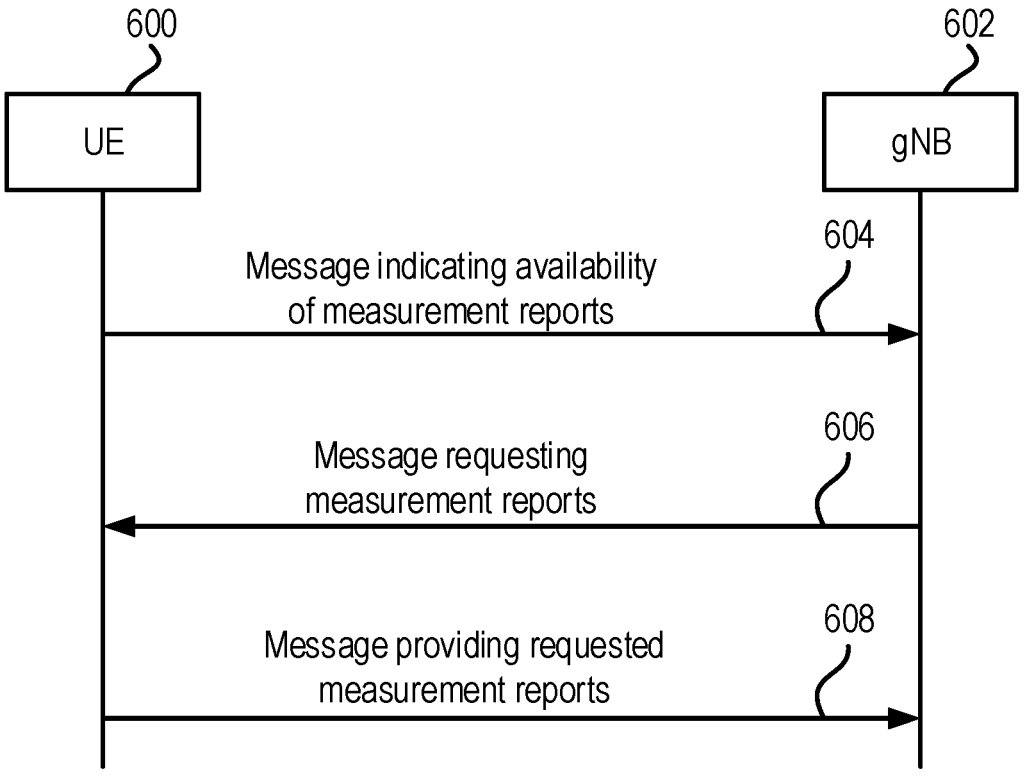
FIG. 6 shows a schematic depicting message exchange between a user equipment and a node to facilitate transmission of measurement reports, in accordance with some embodiments of the present disclosure.

The following discussion focuses on the measurements that can be performed by the UE and reported to a first network node, e.g. the base station. FIG. 6 shows a schematic depicting message exchange between a UE 600 and a gNB 602 to facilitate transmission of measurement reports from the UE to the gNB. In some embodiments, the gNB 602 can be a such as the second node discussed above. In some embodiments, the eNB 602 can be communicably coupled to a second node, and can relay the measurement reports provided by the UE 600 to the second node. The communication between the UE 600 and the gNB 602 can include at least three steps. In step 1 (604), the UE 600 can transmit a message to the gNB 602 indicating the availability of measurement reports. In response, in step 2 (606), the gNB 602 can transmit a message to the UE 600 requesting the measurement reports. Responsive to receiving the request for measurement reports from the gNB 602, in step 3 (608), the UE 600 can transmit the measurement reports to the gNB 602.

The UE 600 can indicate in step 1 (604) the availability of one or more measurement reports. For example, the reports can include RACH success report, RACH failure report, RLF report, etc. Each of these measurement reports are discussed below.

In some embodiments, a first network node can determine more parameters according to the information reported from UE's side. In some embodiments, the first network node can report the measured parameter to a second network node periodically. The reporting period can be specified in the specification, or configured from the second network node (e.g. CN) to the first network node (e.g. gNB/eNB), or configured by the first network node and provided to the second network node from the first network node. In some embodiments, the first network node can report the measured parameter to a second network node if the measured parameters is lower, or lower or equal to, or higher, or higher or equal to a configured threshold. The threshold can be specified in the specification, or configured from the second network node (e.g. CN) to the first network node (e.g. gNB/eNB), or configured by the first network node and provided to the second network node from the first network node.

RACH Success Report

A RACH success report can store measurements related to successful completion of RACH by the UE 600. In some embodiments, the RACH success report may not include the measurements related to the first successful RACH, as those measurements may be included in the RLF report. In some examples, the RACH report can include information on one or more triggering events that triggered the measurement performed by the UE 600. The triggering events can include, for example, at least one of an initial access from the RRC_IDLE state, an RRC connection re-establishment procedure, DL or UL data arrival during the RRC_CONNECTED state when UL synchronization status is "nonsynchronized," arrival or UL data during the RRC_CONNECTED state when there are no PUCCH resources for SR available, SR failure, request by RRC upon synchronization reconfiguration (e.g., during handover), a transition from the RRC_INACTIVE state, to establish time alignment at SCell addition, request for other SI, or beam failure recovery.

The RACH report also can include time connection failure indicating the time elapsed since the last handover initialization until connection failure. The RACH report also can include time since failure indicating the time elapsed since connection establishment failure. The RACH report further can include a list of beam indexes of the beams on which the UE has attempted the RACH procedure. The RACH report also can include the beam type (e.g., SSB or CSI-RS) for each beam on which the UE has attempted the RACH procedure. The RACH report can additionally include the number of preambles sent for each beam on which the UE has attempted the RACH procedure. The RACH report also can include the index of the beam where BFR occurs if the RACH is triggered by BFR. The RACH report further can include a BFR time stamp indicating the absolute time when BFR occurs if the RACH is triggered by BFR. The RACH report also can include the parameter contentionDetected, which indicates that a contention was detected for at least one of the transmitted preambles. The RACH report further can include the parameter maxTxPowerReached, which can whether or not the maximum power level was used for the last transmitted preamble. The RACH report additionally can include a success time stamp indicating the absolute time when RACH is successfully completed. The RACH report also can include the RACH type indicator, which can be selected between two-step and four-step. In some example, the RACH type can be determined by the RACH type of the first RACH attempt. In another example the RACH type can be determined by the RACH type of the latest RACH attempt. The RACH report further can include the number of four-step RACH attempts in the RACH procedure. The RACH report additionally can include the number of two-step RACH attempts in the RACH procedure. The RACH report also can include fallback indications, which can be set to true if at least one fallback occurs during the RACH procedure. The RACH report can also include the number of preambles sent through SUL and/or the number of preambles sent through NUL. The above list of items in the RACH report is not exhaustive, and the RACH report can include a combination of any of the above mentioned items and any additional measurements performed by the UE.

RACH Failure Report

In the event of a RACH failure, the UE can declare a radio link failure (RLF) and can select a suitable cell to re-establish an RRC connection by initiating RACH. The RACH related measurements performed by the UE prior to declaring the RLF can be stored in the RACH failure report. On the other hand, RLF related measurements (including RACH related measurements during re-establishment of the RRC connection) can be stored in the RLF report instead. In some embodiments, the RACH failure report can be included in the RLF report.

The RACH failure report can include information on one or more triggering events that triggered the measurement performed by the UE. For example, the triggering events can include initial access from the RRC_IDLE state, an RRC Connection re-establishment procedure, a DL or a UL data arrival during the RRC_CONNECTED state when UL synchronization status is "non-synchronized," a UL data arrival during the RRC_CONNECTED state when there are no available PUCCH resources for SR, SR failure, a request by RRC upon synchronous reconfiguration (e.g. during handover), a transition from the RRC_INACTIVE state, to establish time alignment at SCell addition, a request for other SI, and a beam failure recovery event.

The RACH failure report can further include a time of connection failure indicating the time elapsed since the last handover initialization until connection failure. The RACH failure report can also include a time since failure indicating the time elapsed since the connection (establishment) failure. The RACH failure report can additionally include a list of beam indexes of the beams on which the UE has attempted the RACH procedure. The RACH failure report can further include the beam type (e.g. SSB or CSI-RS) for each beam on which the UE has attempted the RACH procedure. The RACH failure report can also include the number of preambles sent for each beam on which the UE has attempted the RACH procedure. The RACH failure report can additionally include the index of the beam where the BFR occurs if the RACH is triggered by BFR. The RACH failure report can also include a BFR time stamp indicating the absolute time when BFR occurs if the RACH is triggered by BFR. The RACH failure report can additionally include the parameter contentionDetected, which can indicate that a contention was detected for at least one of the transmitted preambles. The RACH failure report can further include BFR location information indicating the location information where the BFR occurred. The RACH failure report can further include the parameter maxTxPower-Reached, which can indicate whether or not the maximum power level was used for the last transmitted preamble. The RACH failure report can also include the RACH type indicator, which can be selected from the two-step and four-step. In some example, the RACH type can be determined by the RACH type of the first RACH attempt. In another example the RACH type can be determined by the RACH type of the latest RACH attempt. The RACH failure report can further include the number of two-step RACH attempts in the RACH procedure and/or the number of four-step RACH attempts in the RACH procedure. The RACH failure report also can include fallback indications, which can be set to true if at least one fallback occurs during this RACH procedure. The RACH report can also include the number of preamble sent through SUL and/or the number of preamble sent through NUL. The above list of items in the RACH report is not exhaustive, and the RACH report can include a combination of any of the above mentioned items and any additional measurements performed by the UE. The above list of items in the RACH report is not exhaustive, and the RACH report can include a combination of any of the above mentioned items and any additional measurements performed by the UE.

RLF Report

The RLF report can include measurements related to radio link failure before a successful RRC connection is established. The RLF report can include the RACH failure report discussed above. The RLF report can further include a BFR indication, for example, when the RLF is triggered by unsuccessful completion of BFR. The RLF report can further include C-RNTI, which indicates the C-RNTI used in the PCell upon detecting radio link failure or the C-RNTI used in the source PCell upon handover failure. The RLF report can further include Connection Failure Type, which can indicate whether the connection failure is due to radio link failure or handover failure. The RLF report can further include Failed PCell ID, which can indicate the PCell in which RLF is detected or the target PCell of the failed handover. The UE can set the E-UTRA Absolute Radio Frequency Channel Number (EARFCN) according to the band used for transmission/reception when the failure occurred. The RLF report can further include failed cell ID, which can indicate the cell in which connection establishment failed. The RLF report can further include previous PCell ID, which can indicate the source PCell of the last handover (source PCell when the last RRC-Connection-Reconfiguration message including mobilityControlInfo was received). The RLF report can further include re-establishment cell ID, which can indicate the cell in which the re-establishment attempt was made after connection failure. The RLF report can further include RLF cause, to indicate the cause of the last radio link failure that was detected. In case of handover failure information reporting (i.e., the connectionFailureType is set to HOF), the UE can set this field to any value. The RLF report can further include a RLF time stamp, indicating the absolute time when RLF occurs. The RLF report can further include a RLF location info, indicating the location where the RLF occurs. The RLF report can further include time connection failure, to indicate the time elapsed since the last handover initialization until connection failure. The RLF report can further include time since failure, to indicate the time that elapsed since the connection (establishment) failure. The RLF report can further include a list of beam indexes of the beams on which the UE has attempted the RACH procedure. The RLF report can further include the beam type (e.g. SSB or CSI-RS) for each beam on which the UE has attempted the RACH procedure. The RLF report can further include the number of preambles sent for each beam on which the UE has attempted the RACH procedure. The RLF report can further include contentionDetected, which can indicate that a contention was detected for at least one of the transmitted preambles. The RLF report can further include maxTxPowerReached, which can indicate whether or not the maximum power level was used for the last transmitted preamble. The RLF report can further include success time stamp, indicating the absolute time when RACH is successfully completed. The RLF report can further include the information included in the RACH failure report or include the RACH failure report, where the RACH failure report includes the information of the latest failure RACH procedure before re-establishment or establishment of RRC connection. The RLF report can further include the information included in the RACH success report or include the RACH success report, where the RACH success report includes the information of the RACH procedure initiated for successful re-establishment or establishment of RRC connection after RLF. The above list of items in the RLF report is not exhaustive, and the RLF report can include a combination of any of the above mentioned items and any additional measurements performed by the UE.

Other RACH Related Measurements

In addition to the measurements performed by the UE, the node or the base station receiving the measurement information from the UEs can determine additional measurement parameters based on the received measurements reports. For example, the node can determine the successful rate of two-step RACH during each granularity period per cell. This rate can be determined based on a ratio of the total number of two-step RACH procedure completed successfully and the total number of two-step RACH procedure initiated during each granularity period per cell. Each RACH procedure initiated may be counted only once regardless of the total preamble transmitted.

In some examples, the node can also determine the successful rate of two-step RACH without fallback during each granularity period per cell. This value can be determined based on a ratio of the total number of two-step RACH procedure completed successfully where no fallback occurs during RACH procedure and the total number of two-step RACH procedure initiated during each granularity period per cell. Each RACH procedure initiated may be counted only once regardless of the total preamble transmitted.

In some examples, the node can further determine the successful rate of four-step RACH procedure during each granularity period per cell. This rate can be determined based on a ratio of the total number of four-step RACH procedures completed successfully and the total number of four-step RACH procedures initiated during each granularity period per cell. Each RACH procedure initiated may be counted only once regardless of the total preamble transmitted.

In some examples, the node can also determine the number of fallback occurrences during each granularity period per cell. This number can be determined based on the number of 2-step RACH procedure initiated where fallback occurs during each granularity period per cell. In another example the node can also determine the possibility of fallback occurrence during each granularity period per cell. This number can be determined based on a ratio of the total number of two-step RACH procedures initiated where fallback occurs during RACH procedure and the total number of two-step RACH procedures initiated during each granularity period per cell. Each RACH procedure initiated may be counted only once regardless of the total preamble transmitted.

For the above mentioned measurements, thresholds can be configured to compare with, if the measurement is higher, or higher or equal to, or lower, or lower or equal to the threshold, will trigger the node to report the result to the second node or CN. The threshold values can be specified in the specification of the NR, or the threshold values can be configured from the core network (CN) to gNB/eNB, or the threshold values can be provided to the CN from the gNB/eNB (e.g., the predetermined interval is determined by gNB/eNB or the second node).

The above mentioned additional RACH based calculations can be performed by the node can be based on the information (e.g., RACH report, RLF report, etc.) provided by the UE.

Beam Related Measurements

In some examples, the node can determine the values of one or more parameters based on the information and reports received from the UE. In some examples, the node can determine a number of BFR during each granularity period per beam. In one approach, this number of BFR can be obtained as a total number of RACH failures with the triggering event being "BFR" plus total number of successful RACH with triggering event being "BFR" during each granularity period per beam, which can be calculated according to the report collected from UE's side. In another approach, every time a BFR occurs the UE can indicate the occurrence of the BFR as well as the beam index to the node by sending a coded signal through the PUCCH. Then node can then calculate the total number of BFR occurrences during each granularity period per beam from the received information.

In another example, the node can determine an average number of attempts required for successful completion of BFR per beam. The average number can be obtained as a sum of the number of preambles sent for each beam on which the UE has attempted the RACH procedure in the RACH success report with triggering events being "BFR" collected per granularity period divided by the number of RACH success report collected with triggering events being "BFR" per granularity period.

In yet another example, the node can determine an average number of attempts required for successful connection recovery after the triggering of BFR per beam. This number can be obtained as a sum of the number of preambles sent for each beam in the RACH success report and the RACH failure report with triggering events being BFR and in the RLF report where the RACH failure report is included, collected per granularity period divided by the number of RACH success report, RACH failure report and the RLF report where the RACH failure report is included collected per granularity period.

In yet another example, the node can determine an average time needed for successful completion of a BFR during each granularity period per cell. The average time can be obtained as a sum of the duration of successful completion of the RACH in the RACH success report with triggering events being "BFR" collected per granularity period per cell divided by the number of RACH success reports collected per granularity period per cell, where the duration of successful completion of RACH in each RACH success report can be obtained as the time difference between the success time stamp and the BFR time stamp in the RACH success report.

In yet another approach, the node can determine an average time needed for successful recovery of RRC connection after triggering of the BFR per cell. The average time can be obtained as a sum of the duration of the successful recovery of RRC connection per granularity period per cell divided by the number of RACH success reports and RLF reports collected per granularity period per cell, where the duration of successful recovery of RRC connection includes the duration of the successful completion of RACH in the RACH success report with triggering event being BFR, and the duration of the successful RRC recovery in the RLF report where BFR indication is included. The duration of the successful RRC recovery can be obtained as the time difference between the success time stamp and the BFR time stamp in the RACH failure report.

How the UE Decides Whether to Perform Measurements

As discussed above in relation to FIG. 6, in step 1, the UE indicates the availability of reports to the gNB. However, the process of the UE performing measurements for inclusion in the reports can be based on certain conditions. In a first aspect, a UE capable of performing measurements may always perform supported measurements in response to a set of triggering events. For example, for RLF related measurements, the UE may always measure related measurements upon detection of RLF, and store the related measurements in memory for reporting to the gNB.

In a second aspect, the UE may perform the measurements according to a measurement configuration received from the network.

In a third aspect, the UE can perform the measurements when triggered by a certain event, where the triggering event can be at least one of: an initiation of Random Access procedure, a RLF, and Event A1 to A6 and Event B1 to B2 defined in the protocol. These events, also described in TS 38331, section 5.5.4, can refer to Event A1: Serving becomes better than threshold, Event A2: Serving becomes worse than threshold, Event A3: Neighbor becomes offset better than SpCell, Event A4: Neighbor becomes better than threshold, Event A5: SpCell becomes worse than threshold1 and neighbor becomes better than threshold2, Event A6: Neighbor becomes offset better than SCell, Event B1: Inter RAT neighbor becomes better than threshold, and Event B2: PCell becomes worse than threshold1 and inter RAT neighbor becomes better than threshold2.

In a fourth aspect, the UE can perform measurements under the control of the network. In one example, the list of measurements can be pre-defined or configured by the network. The configuration can include for example, "L2MeasRequest_i", $1<=i<=2^{Num\_of\_MeasType}-1$, where Num_of_MeasType equals to the total number measurement types defined. Each List of measurements, which includes a list of different measurement types, can be used to enable one or more types of measurements that can be performed. Each type of measurements can include a series of measurement quantities. For example, if there are RLF related measurement, RACH related measurement and mobility related measurement, then the lists of measurements requested can be considered as:

L2MeasRequest_1: RLF related measurement;
L2MeasRequest_2: RACH related measurement;
L2MeasRequest_3: Mobility related measurements;
L2MeasRequest_4: RLF related measurement, RACH related measurement;
L2MeasRequest_5: RLF related measurements, Mobility related measurements;
L2MeasRequest_6: Mobility related measurements, RACH related measurements;
L2MeasRequest_7: RLF related measurement, RACH related measurement, Mobility related measurement.

The node or the network can broadcast the list of measurements requested to be performed by the UEs, or can be delivered in system information or by RRC signaling. For example, if a UE receives a reconfigure message with the L2MeasRequest_1 included, the UE can perform the RLF related measurements if an RLF occurs and follows the procedure as illustrated in the general procedure part.

In another example, a bitmap can be utilized with each bit is mapped to one type of measurements. A "0" can indicate that the corresponding measurements is not required to be performed, while a "1" can indicate that the corresponding measurements is required to be performed if triggered. The mapping of the types of measurements to each bit can be pre-defined in the protocol or configured by the network. The mapping relationship and the bitmap used for enabling certain type of measurement can be delivered to UE by broadcast information, system information or RRC signaling. For example, if there are 3 type of measurements, then a 3-bit bitmap can be used for enable each type of measurement, e.g. bit map equals to "101" means first and second type of measurement is enabled.

Any combination of the above discussed aspects can also be utilized. For example, the fourth aspect discussed above can be combined with the second or the third aspect. The fourth aspect discussed above can be used to indicate whether a certain type of measurement is allowed to be performed by the UE, while the actual timing for performing the measurement is based on the measurement configuration or the timing of the occurrence of a triggering event.

How UE Indicates the Availability of Measurements to be Fetched

With reference to Step 1 shown in FIG. 6, the following discusses the conditions under which the UE can indicate the availability of one or more reports to the gNB. In NR the RACH resource (e.g., RACH occasions and preambles) is closely related to the beams, and some measurements are also performed at beam level. To introduce beam level measurements can be helpful for better beam management and resource configuration. As beam quality and correspondence is continuously changing due to variance in networking environment, the mobility of users, the interference from other users, etc., it can be useful to find an efficient way to report the beam related measurement results to guarantee the validity of measurements, or in other words, to keep the measurements up to date. Upon detection of a beam failure, the UE can trigger a BFR procedure by initiating a RACH procedure in an attempt to find a suitable beam to perform BFR.

The availability of a report can be indicated to the node in several ways. In a first approach, the indication or a list of indication can be sent through an RRC message, e.g., RRCSetupComplete message. In some example, each indication is used to indicate the availability of certain type of measurement report, e.g. inclusion of the indication means the corresponding report is available, while absence of the indication means the corresponding measurement report is not available. Or in another example, by setting the indication to "1" means the corresponding report is available, while setting the indication to "0" means the corresponding measurement report is not available. In a second approach, the indication or a list of indications can be sent through a signal transmitted in the PUCCH. In a third approach, the indication can be sent using a MAC control element (MAC CE). For example, a message can include "UE Info Available MAC CE", identified by MAC sub-header with LCID equals to one of the reserved value as specified in the protocol. The MAC CE can be zero bits long, upon receiving the UE Info Available MAC CE indicates the UE information report is available. Or in another example, the MAC CE can be N octets long, containing a bitmap with each bit mapped to one type of measurement report. "0" can indicate that the corresponding measurement report is not available, while a "1" can indicate that the corresponding measurements is available. The mapping of types of measurement report to each bit can be pre-defined in the protocol or configured by the network. If the total number of measurement report type is smaller than 8*N, than the rest bits of this MAC CE can be set to reserved. Where reserved bit can always be set to "0". Any combination of the four approaches discussed above can also be utilized.

In some embodiments, after successful completion of RACH, the related measurements can be stored in RACH success Report. If RRC message is included in Msg3 of the four-step RACH or payload part of Msg1 of the two-step RACH, an Information Element (IE), e.g., "RACHSuccessInfoAvailability" can be included in the subsequent RRC message, e.g. RRCResumeComplete, RRCSetupComplete, RRCReestablishmentComplete, or RRCReconfiguration- Complete, to indicate the availability of RACH success report. For example, after completion of RRC connection set up, UE can indicate that the RACH success report is available by setting "RACHSuccess-InfoAvailability" as true in the RRCSetupComplete. In another example, the UE can indicate the availability of the RACH success report as soon as possible after the successful completion of RACH using a signal similar to Scheduling Request (SR) transmitted in PUCCH, or by transmitting a MAC CE e.g., "RACH Success Info Available MAC CE" to base station.

In instance where a RACH failure occurs, the UE can declare a radio link failure (RLF) and attempts to select a suitable cell to re-establish the RRC connection by initiating RACH. The RACH related measurements can be stored in a RACH failure report and other RLF related measurements can be stored also in the RLF report. Furthermore, the RACH failure report can be included in the RLF report. The UE can indicate the availability of the RLF report at each subsequent LTE RRC connection (re-)establishment, RRC connection resume or handover, which can be done by an IE included in the RRC message, e.g., "rlf-InfoAvailable" in RRCResumeComplete, RRCSetupComplete, RRCReestablishmentComplete or RRCReconfigurationComplete. Furthermore, an IE, e.g., "RACHFailure-InfoAvailability" can be included in RRCResumeComplete, RRCSetupComplete, RRCReestablishmentComplete or RRCReconfiguration-Complete to indicate the availability of RACH failure report.

When to Clear Stored Measurement Results

In relation to step 3 discussed above with reference to FIG. 6, the UE may clear the report from memory under certain conditions. For example, in a first approach, the UE can clear the measurements immediately after reporting the report to the node. In a second approach, the UE can clear the measurements from memory after receiving a positive acknowledgement from the node of the successful reception of the measurement report. In a third approach, the UE can continue to store the measurement report until the next measurement is triggered. In a fourth approach, different validity periods can be configured to different measurement quantities. If the measurement results haven't been fetched and the validity period has passed, then the measurement results will be cleared. The validity period can be configured by the network, or configured by the CN or configured by the second network node or pre-defined in the protocol. Furthermore, any combination of the four approaches discussed above can be utilized to determine when to clear the measurement reports at the UE.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method, comprising:
determining, by a first wireless communication node, a maximum number or a mean number of at least one user equipment (UE) staying in an inactive state according to a network slice;
determining, by the first wireless communication node, at least one parameter related to wireless communication devices in a wireless communication network, wherein the wireless communication devices comprise the at least one UE staying in the inactive state, wherein the at least one parameter includes the maximum number or the mean number of wireless communication devices remaining in the inactive state, wherein when a UE is staying in the inactive state, the UE belongs to a cell in which a context related to the UE is stored; and
reporting, by the first wireless communication node, the at least one parameter to a second wireless communication node associated with the wireless communication network, wherein the first wireless communication node comprises a base station and the second wireless communication node comprises a core network node.

2. The method of claim 1, comprising:
determining, by the first wireless communication node, the at least one parameter during each time period per cell of the wireless communication network;
determining, by the first wireless communication node, the mean number of the at least one UE across a plurality of public land mobile networks (PLMNs);
determining, by the first wireless communication node, the maximum number of the at least one UE across the plurality of PLMNs;
determining, by the first wireless communication node, the mean number of the at least one UE according to non-public network (NPN) identifiers, IDs; or
determining, by the first wireless communication node, the maximum number of the at least one UE according to the NPN IDs.

3. The method of claim 1, wherein the at least one parameter includes a total number of transactions between the inactive state and at least one of an idle state or a connected state.

4. The method of claim 1, wherein the at least one parameter includes a number of system information (SI) requests for each SI messages or for each system information block (SIB) received from a wireless communication device.

5. The method of claim 1, wherein the at least one parameter includes a percentage of transmission time for system information request received from a wireless communication device.

6. The method of claim 1, wherein the at least one parameter includes a number of preambles used for a random-access channel process.

7. The method of claim 1, wherein the at least one parameter includes a number of preambles used for a random-access channel process of a 4-step random access type.

8. The method of claim 1, wherein the at least one parameter includes a number of preambles used for a random-access channel process of a 2-step random access type.

9. A first wireless communication node, comprising:
at least one processor configured to:
determine a maximum number or a mean number of at least one user equipment (UE staying in an inactive state according to a network slice;
determine at least one parameter related to wireless communication devices in a wireless communication network, wherein the wireless communication devices comprise the at least one UE staying in the inactive state, wherein the at least one parameter includes the maximum number or the mean number of wireless communication devices remaining in the inactive state, wherein when a UE is staying in the inactive state, the UE belongs to a cell in which a context related to the UE is stored; and
report the at least one parameter to a second wireless communication node associated with the wireless communication network, wherein the first wireless communication node comprises a base station and the second wireless communication node comprises a core network node.

* * * * *